US012543277B2

(12) United States Patent
Su et al.

(10) Patent No.: US 12,543,277 B2
(45) Date of Patent: Feb. 3, 2026

(54) ELECTRICAL PLUG FALL DETECTION IN A WIRELESS DEVICE

(71) Applicant: PLUME DESIGN, INC., Palo Alto, CA (US)

(72) Inventors: Ming-Tsung Su, Taipei (TW); Rich Chang, Palo Alto, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 362 days.

(21) Appl. No.: 18/188,109

(22) Filed: Mar. 22, 2023

(65) Prior Publication Data
US 2024/0324115 A1 Sep. 26, 2024

(51) Int. Cl.
*H04W 84/12* (2009.01)
*G01B 5/14* (2006.01)
*H01R 13/66* (2006.01)
*H05K 5/00* (2006.01)

(52) U.S. Cl.
CPC .............. *H05K 5/0069* (2013.01); *G01B 5/14* (2013.01); *H01R 13/6683* (2013.01); *H04W 84/12* (2013.01); *H05K 5/0073* (2013.01)

(58) Field of Classification Search
CPC ...... H05K 5/0069; H05K 5/0073; G01B 5/14; H01R 13/6683; H04W 84/12
See application file for complete search history.

(56) References Cited

U.S. PATENT DOCUMENTS 8,941,976 B1 * 1/2015 Maroney .................. H04B 3/56
439/639

FOREIGN PATENT DOCUMENTS

WO    WO-2020081000 A1 * 4/2020    ........... H01R 13/703

* cited by examiner

*Primary Examiner* — Ayodeji O Ayotunde
(74) *Attorney, Agent, or Firm* — Nicholas Martin; Greenberg Traurig, LLP

(57) ABSTRACT

Systems and methods for detecting a first level disengagement of the wireless access point electrical plug with the electrical outlet and providing a notification responsive to the first level of disengagement of the electrical plug with the electrical outlet. Detecting a second level of disengagement that is larger than the first level disengagement of the electrical plug with the electrical outlet and turning off the power supply responsive to the second level disengagement. The response to the second level disengagement of the electrical plug with the electrical outlet includes turning off the power supply such that the one or more additional access points take over the Wi-Fi access from the access point. The sensor can be either mechanical or optical and the distance of detecting the first level and second level disengagement is measured in millimeters.

17 Claims, 14 Drawing Sheets

ELECTRICAL PLUG FALL DETECTION IN A WIRELESS DEVICE

FIELD OF THE DISCLOSURE

The present disclosure generally relates to wireless networking systems and methods. More particularly, the present disclosure relates to systems and methods for detecting and responding to the disengagement of the electrical plug of a wireless device with an electrical outlet.

BACKGROUND OF THE DISCLOSURE

Wi-Fi networks (i.e., wireless local area networks (WLAN) based on the IEEE 802.11 standards) are ubiquitous, and the primary network used in homes. In fact, Wi-Fi is the most common technique for user device connectivity, and the applications that run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The Wi-Fi network deployed in a physical location, e.g., home, business, store, library, school, etc. can consist of different topologies to provide different physical coverage including mesh, star, tree, ring, etc. The vast majority of connected devices use Wi-Fi for their primary network connectivity. The wireless access points (AP) can be deployed throughout a physical location and can be strategically located to provide the best Wi-Fi connection and also take advantage of electrical power outlets available.

BRIEF SUMMARY OF THE DISCLOSURE

The present disclosure relates to systems and methods for detecting disengagement of a wireless device electrical plug with the electrical outlet including a first and second level detection utilizing a mechanical sensor. The detection of the first level disengagement includes providing a local optical notification and a notification to a user electronic device(s), and the detection of the second level disengagement includes turning off the power supply responsive to the disengagement of the electrical plug with the electrical outlet, such that the one or more additional access points take over the Wi-Fi access from the access point.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure is directed to systems and methods for detecting and responding to the disengagement of the electrical plug of a wireless device with an electrical outlet.

§ 1.0 WI-FI NETWORK TOPOLOGIES

Figure 1:
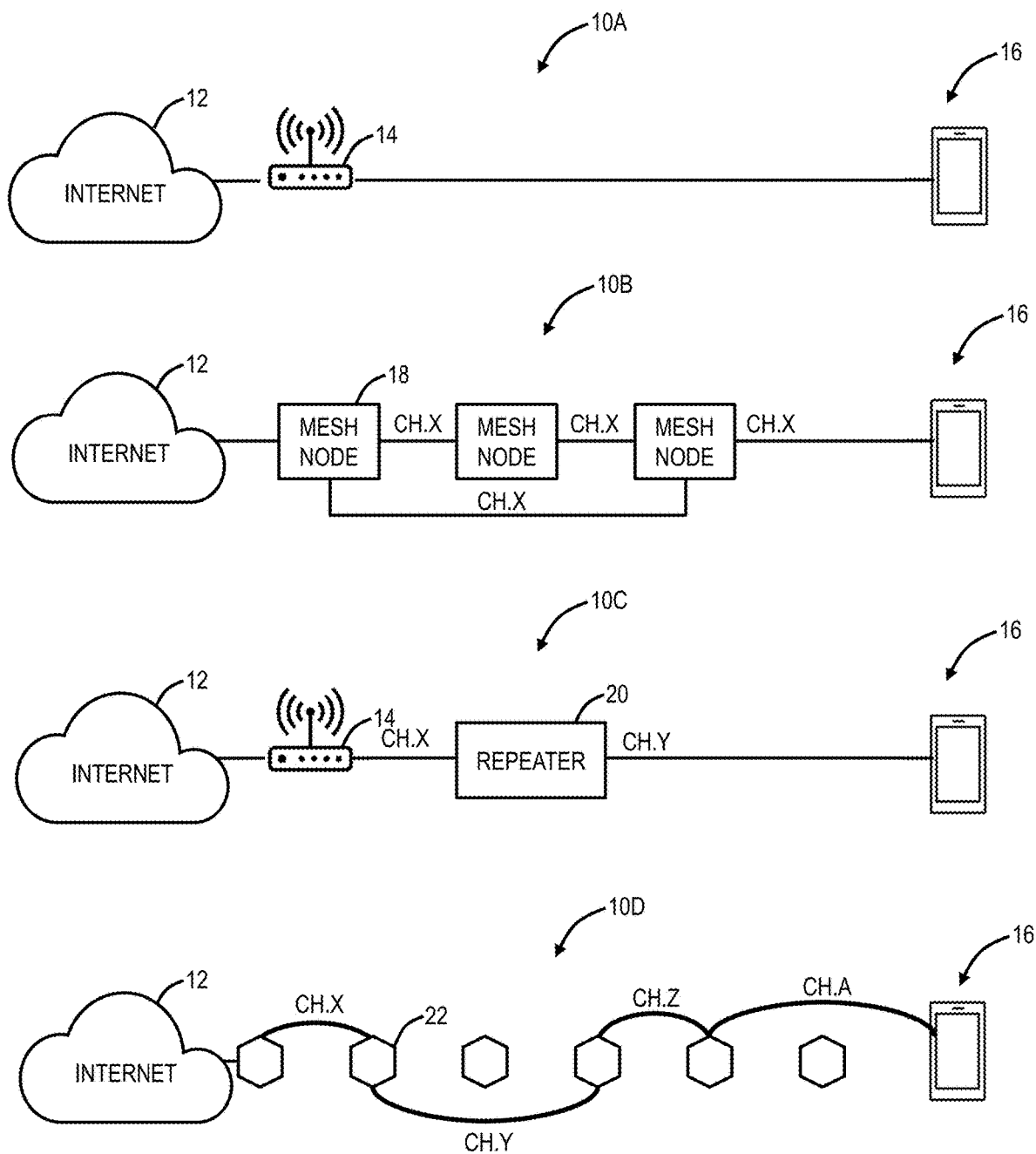
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
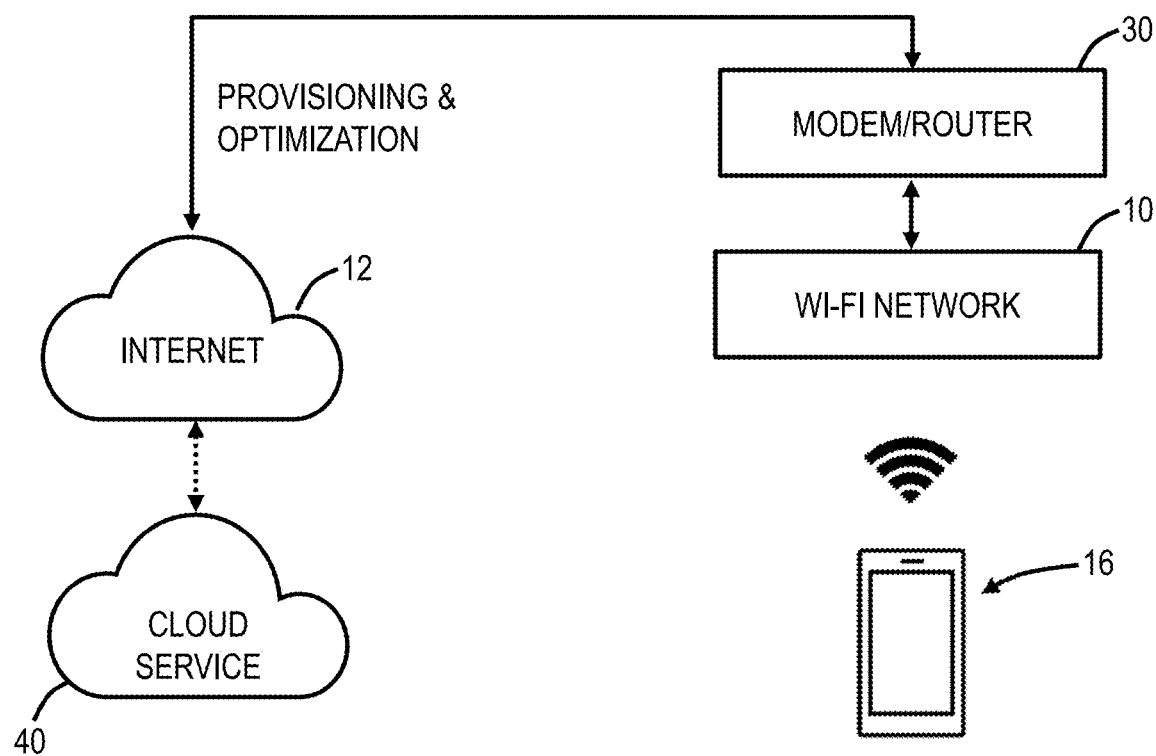
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
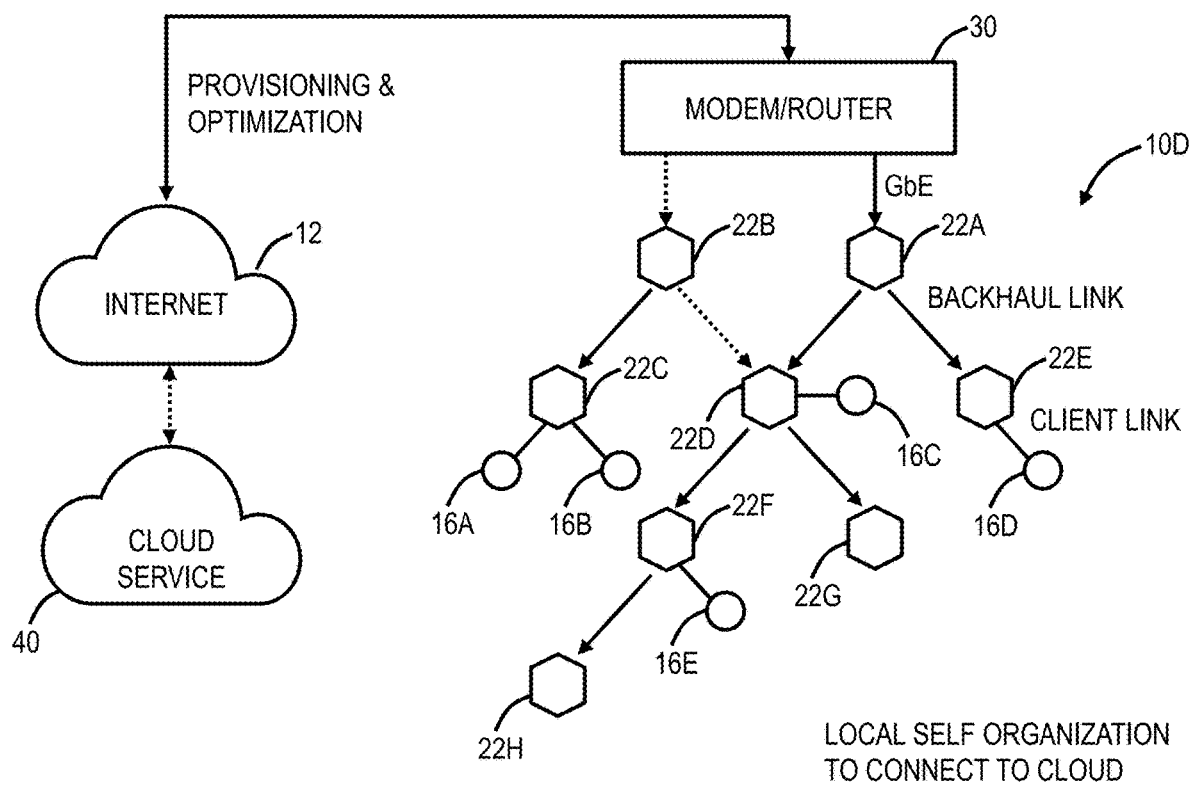
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an embodiment, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an example gigabit Ethernet (GbE) wired connection to the modem/router 30. Optionally, the access point 22B also has a wired connection to the modem/router 30, such as for redundancy or load balancing. Also, the access points 22A, 22B can have a wireless connection to the modem/router 30. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10D differs from a conventional Wi-Fi mesh network in that the client links and the backhaul links do not necessarily share the same Wi-Fi channel, thereby reducing interference. That is, the access points 22 can support at least two Wi-Fi wireless channels-which can be used flexibly to serve either the client link or the backhaul link and may have at least one wired port for connectivity to the modem/router 30, or for connection to other devices. In the distributed Wi-Fi network 10D, only a small subset of the access points 22 require direct connectivity to the modem/router 30 with the non-connected access points 22 communicating with the modem/router 30 through the backhaul links back to the connected access points 22A, 22B. Of course, the backhaul links may also be wired Ethernet connections, such as in a location have a wired infrastructure.

§ 2.0 ACCESS POINT

Figure 3A:
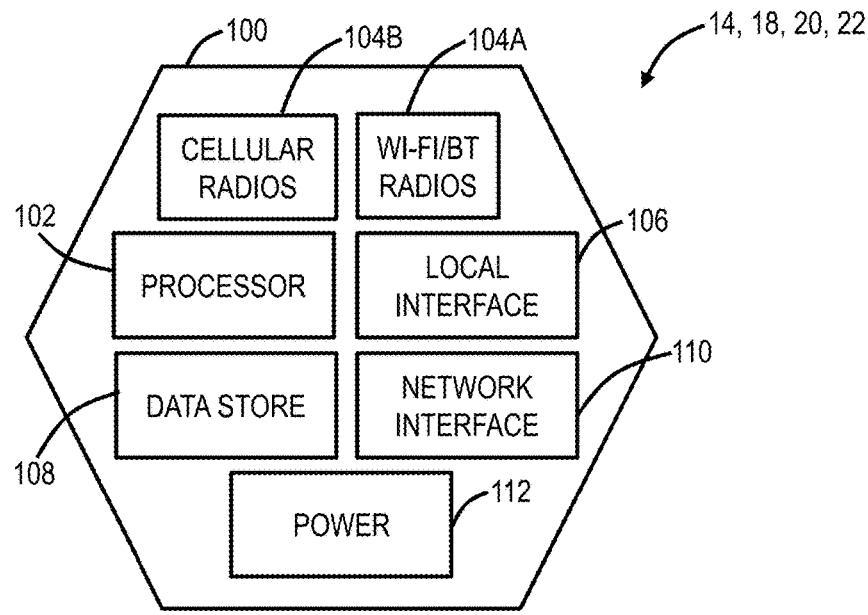
FIG. 3A is a block diagram of functional components of the access points, mesh nodes, repeaters, etc., in the Wi-Fi networks of FIG. 1.

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104B can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104B such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 16. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 30. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

Figure 3B:
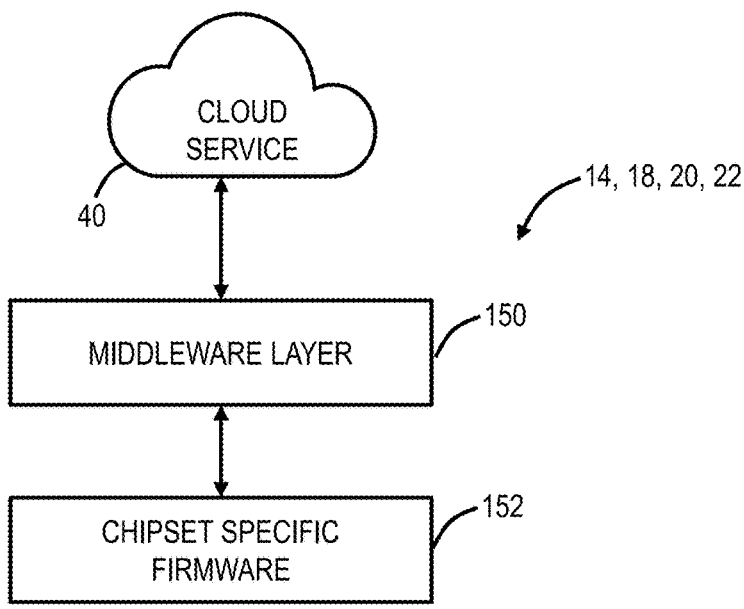
FIG. 3B is a logical diagram of the access points, mesh nodes, repeaters, etc. with a middleware layer to enable operation with the cloud service.

FIG. 3B is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as describe in www.opensync.io/documentation, the contents of which are incorporated by reference. Again, OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry
  Collecting measurements reported by the low-level drivers
  Compiling and pre-processing the measurements into statistics that are uniform across different devices
  Presenting the statistics using standardized formats
  Preparing the formatted statistics for transfer to the cloud using serialization and packetizing
  Communicating the statistics to the cloud using standardized and efficient telemetry Management/Control
  Defining a standard interface for control messaging from the cloud service 40
  Providing operations necessary to manage the services, such as onboarding and provisioning
  Providing rules-based networking configurations to block, filter, forward, and prioritize the messages
  Implementing software to manage the device maintenance functions, including logging, firmware upgrades, and debugging Cloud-Managed Services
  Wi-Fi, including mesh networks that dynamically adapt to their environments
  User access management
  Cybersecurity
  Parental controls
  IoT device management
  Additional services Through use of the middleware layer 150, it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with OpenFlow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 CLOUD SERVER AND USER DEVICE

Figure 4:
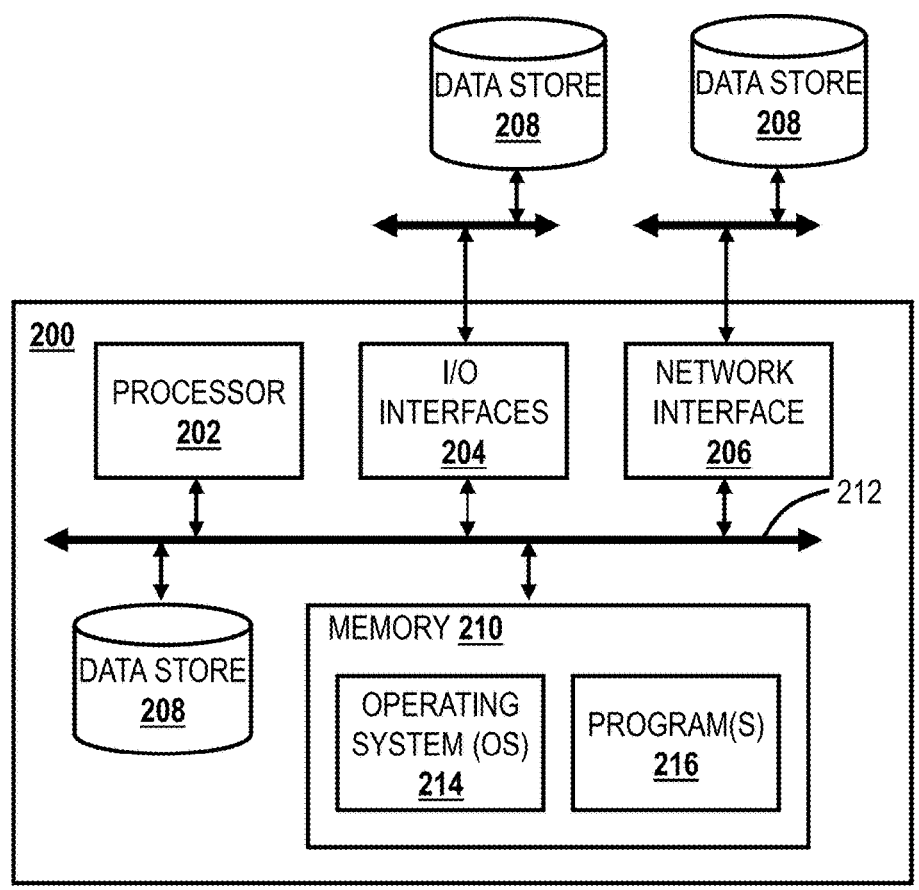
FIG. 4 is a block diagram of functional components of a server, a Wi-Fi client device, or a user device that may be used with the Wi-Fi network of FIG. 1 and/or the cloud-based control of FIG. 2A.

FIG. 4 is a block diagram of functional components of a server 200, a Wi-Fi client device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable e appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, InfiniBand, ISCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 3.1 App for Control

In general, a single app, such as a mobile app, desktop app, etc., can be used to monitor and control the Wi-Fi network 10. The configuration can define security, encryption, SSID, WPA settings, device certificates, prioritization, time of day, etc. In an embodiment, the mobile app is HomePass, available from the Applicant, Plume Design, Inc. Example features of the mobile app include, without limitation:

Wi-Fi hardware is discovered over Bluetooth so the system is up and running in minutes Intuitive self-install feature, which eliminates the need for technician costs and scheduling Advanced, automatic identification of devices in the home, complete with icons and names.

View how the network is connecting with a visual topology representation of all access points and connected devices Creates flawless connectivity across device types, rooms, and complex environments using AI-based optimization Provides complex network visibility with unique device fingerprinting and speed tests The cloud-coordinated system harmonizes legacy deployments via OpenSync-compatible hardware Privacy Manager to temporarily freeze visibility Parental control tools to set healthy boundaries for access and usage Guest Manager for access permissions and passwords Content Manager to filter and block unwanted websites and ads for parents and more Digital Wellbeing monitors screen time with scheduled freezes and pauses Online protection from malicious content-Learn more about protecting homes in the connected age Real-time threat database IoT anomaly detection and device quarantine Intrusion detection and outside threat blocking Motion detection via radio waves to let subscriber-owned devices become sensors to detect expected and unexpected movement No need to remember to enable the system, the system turns on and off automatically through GPS of primary devices See movement patterns over the course of time within the mobile app

§ 4.0 WI-FI NETWORK WITH WIRED AND WIRELESS CONNECTIVITY

Again, the access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
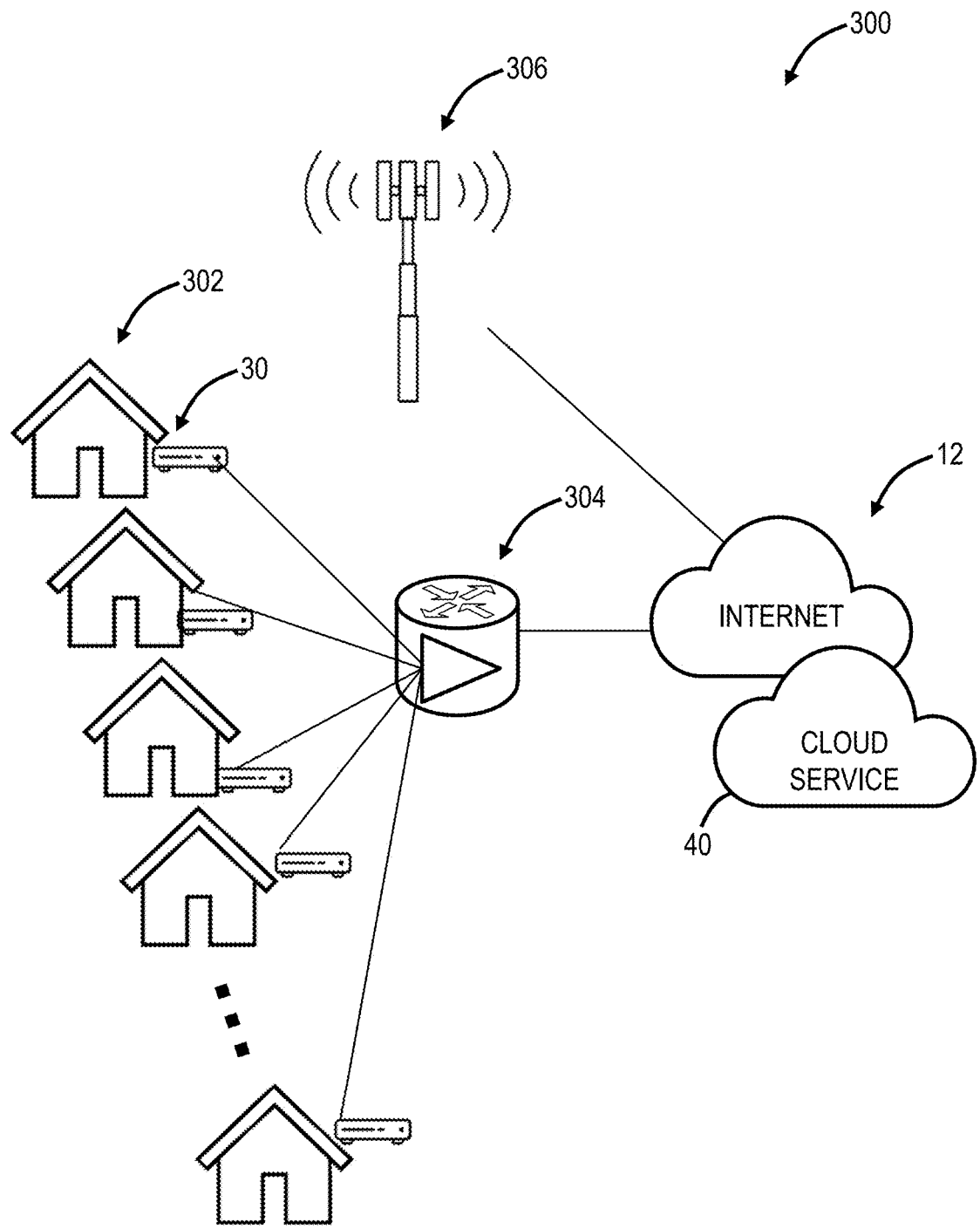
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 6:
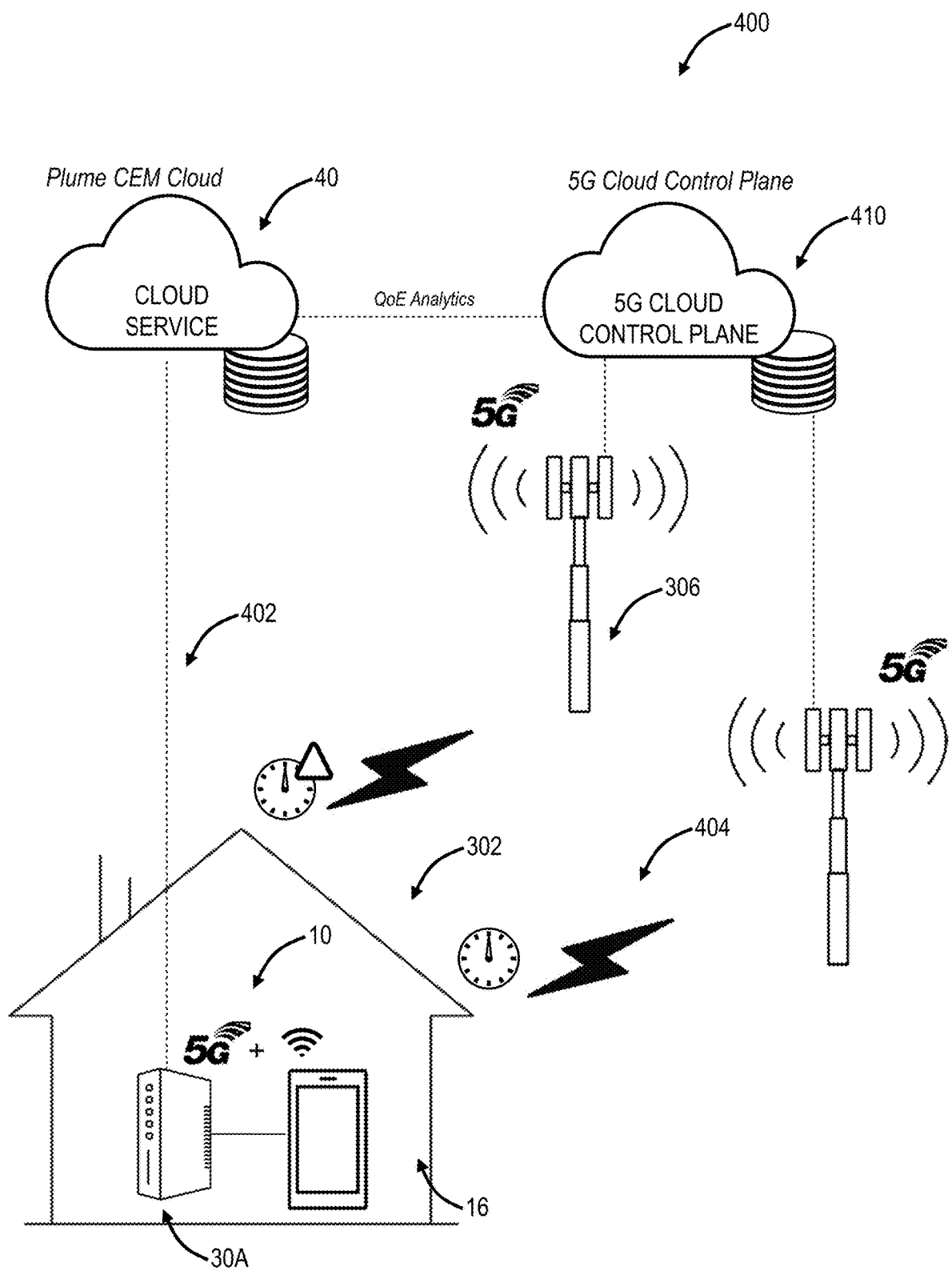
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 ISLAND AROUND PRONGS AT THE BACK OF THE DEVICE

Figure 7:
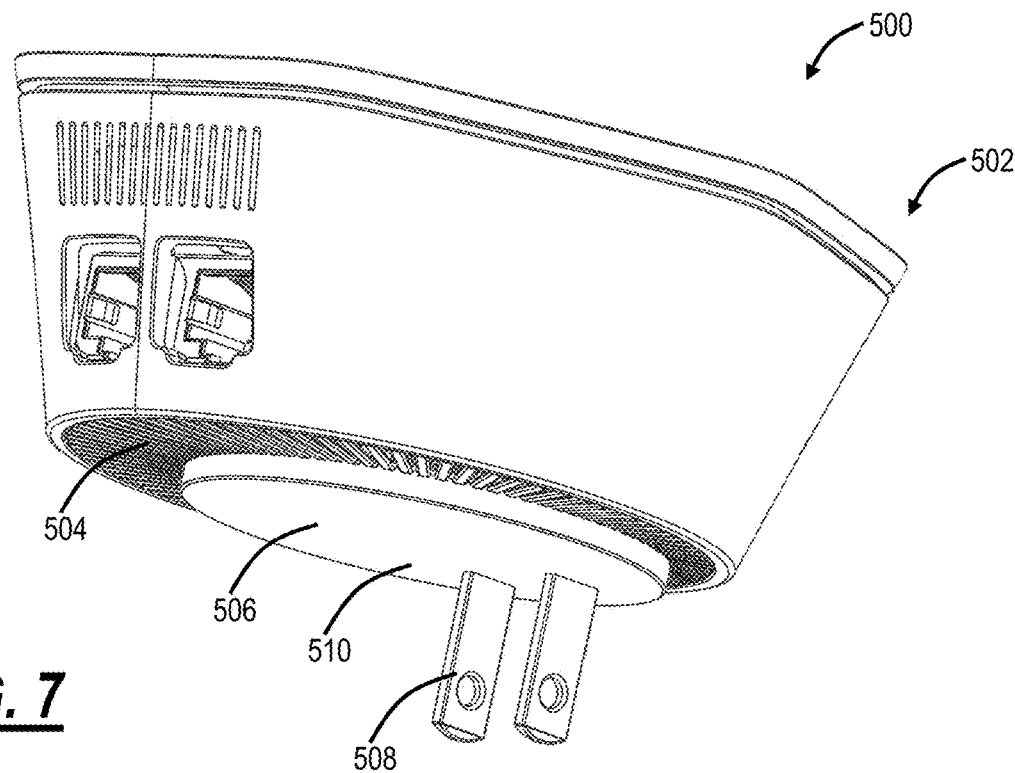
FIG. 7 is a perspective diagram depicting a rear portion of the physical form factor of the access point that plugs directly into the wall.
Figure 8:
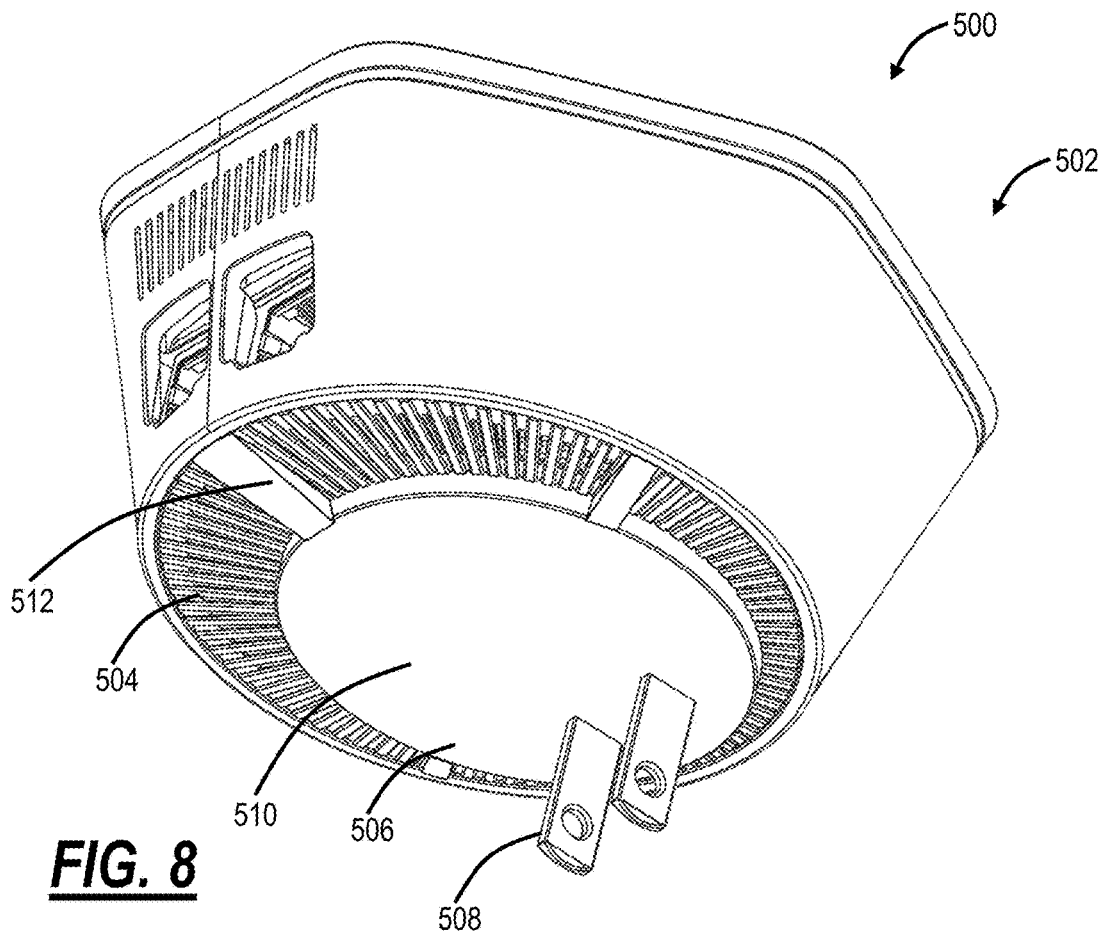
FIG. 8 is a perspective diagram further depicting a rear portion of the physical form factor of the access point that plugs directly into the wall.

FIGS. 7 and 8 are diagrams of a bottom portion of the physical form factor of the access point 502 that plugs directly into the wall. In an embodiment, the physical form factor is a compact physical implementation where the access point directly plugs into an electrical outlet and is physically supported by the electrical plug connected to the electrical outlet.

The access point 502 can be a fairly large device to be directly plugged into the wall. The extensive heat sinking within it makes it relatively heavy. Innovative techniques were required to make it stable when plugged in, preventing it from falling out. In addition, it has vents 504 on the bottom portion 506 to allow cooling airflow while hiding the less attractive vents from the consumer. Both of the above goals are met by having an "island" 510 of material around the electrical plug 508. This raised section, shown in FIGS. 7 and 8 as the island 510 creates a gap for airflow, and provides a large enough area to stabilize the physical form factor against the wall and prevent it from falling out of the plug.

The goals can be achieved with less material and exposing more area to potential venting and airflow by using fin type shapes rather than a solid island. FIG. 8 is a diagram illustrating a fin 512, in this case extending the area of the island 510 in FIG. 7 to create even more stability while sacrificing very little of the area available for venting. Shown also are channels in the fins to allow some cross airflow between regions that are otherwise separated by the fins. While the channel is shown relatively narrow, the channels could be wide, and the fins themselves could be more like small tabs that are strategically located but leave most of the back open for venting and air circulation.

The elements of this approach include:

A raised area on the back that stabilizes against the wall, helps device stay in the socket;

However, it leaves a gap for the air vents to circulate air by being raised; and A stabilizer which is not solid. It could be similar to legs that go out to allow even more area for vents. Or it could even be just dots, or points that come out to stabilize.

§ 5.1 Power Plug Solders Directly without Wires

Figure 9:
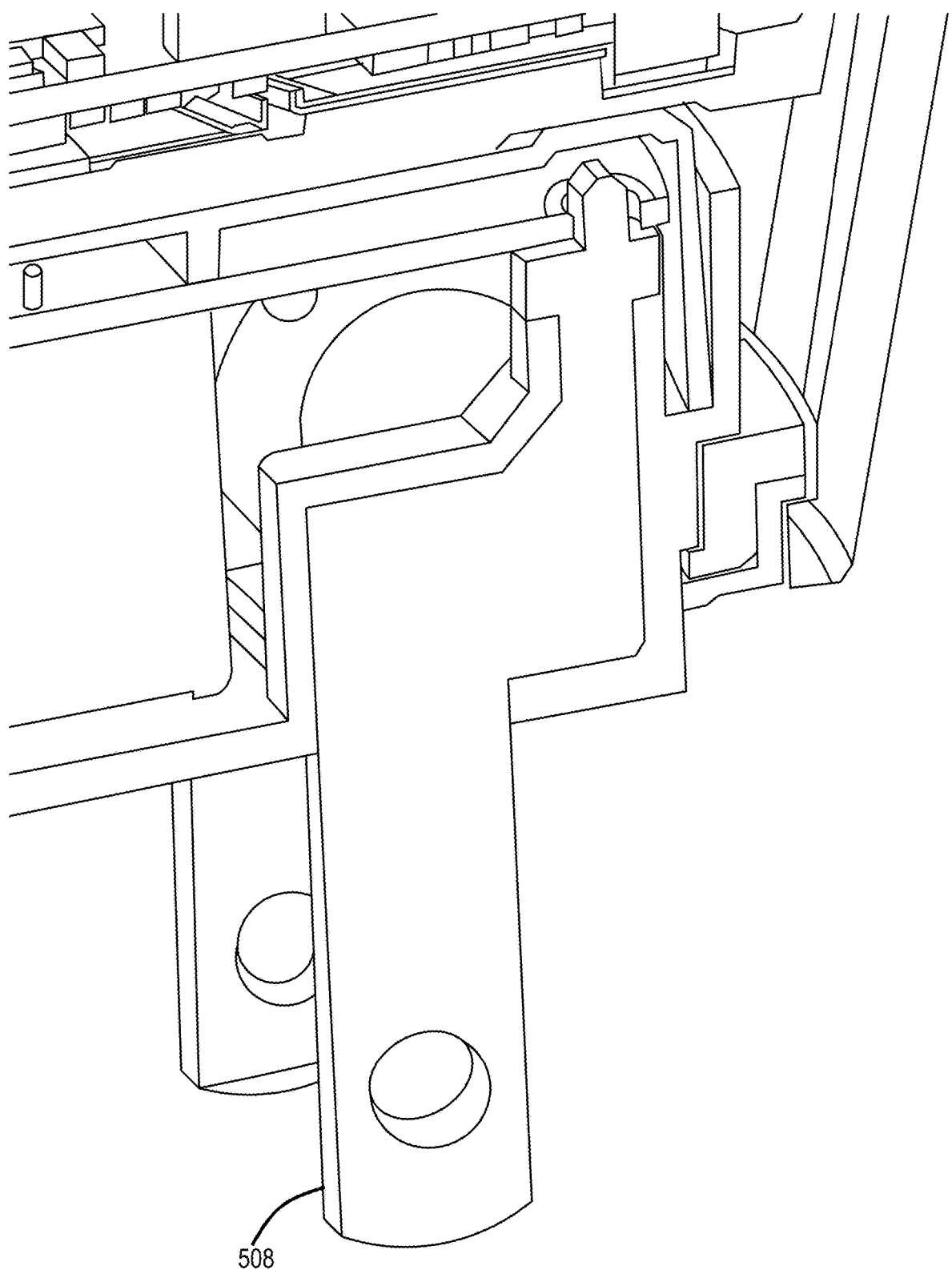
FIG. 9 is a diagram of an arrangement in the access point using the electrical plug as an anchor.

The access point 500 is unique among Wi-Fi devices in that it plugs directly into a wall socket. This has an elegance and simplicity, eliminating wires, which is desirable to the consumer for aesthetics. However, anchoring the electrical plugs 508 in a device that is small and extremely crowded inside is challenging. The access point 500 uses an innovative system for anchoring and electrically connecting the electrical plug 508. FIG. 9 is a diagram of an arrangement in the access point 500 using the electrical plug 508 as an anchor. This arrangement provides strength and rigidity for the electrical plug 508 and does not require any expensive free hand soldering during assembly. No wire or extra parts are required to make the connection between the electrical plug 508 and the PCB.

Some of the innovative aspects of this plug design include

Sheet metal prongs for the electrical plug 508 that can be directly soldered to the PCB;

The blade is held very tight by a thickness in the z-dimension which is only around where the electrical plug 508 is, leaves a lot of space for the components to go into; and Also, the electrical plug 508 can be completely covered by plastic to the PCB 20 which helps pass electrical safety requirements.

In an embodiment, an access point includes a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and an electrical plug connected to the power supply and extending from the bottom portion for insertion into an electrical outlet for power and for physical support of the access point adjacent to the electrical plug. The electrical plug can include metal prongs directly soldered to one of the at least one PCB.

The access point 500 has a compact form-factor that is configured to directly plug into an electrical outlet. Accordingly, the form-factor is limited in size to ensure the access point 500 does not obstruct other electrical outlets and so that the weight of the access point 500 can be supported by the electrical outlet and the electrical plug 508.

Figure 10:
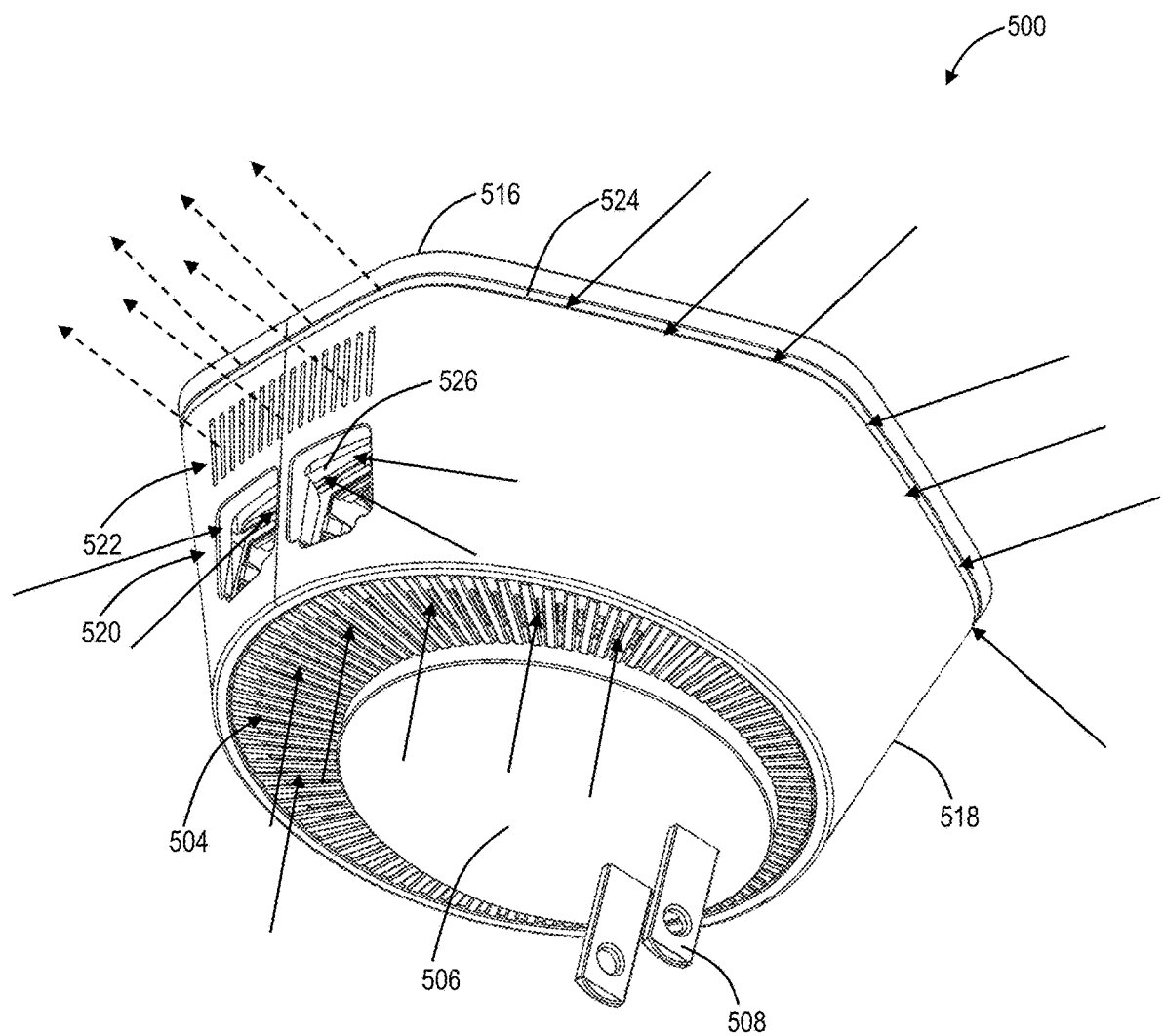
FIG. 10 illustrates air flow in the access point with air intake (cold or room temperature air) shown in solid lines and air exhaust (warm air) shown in dotted lines.
Figure 10:
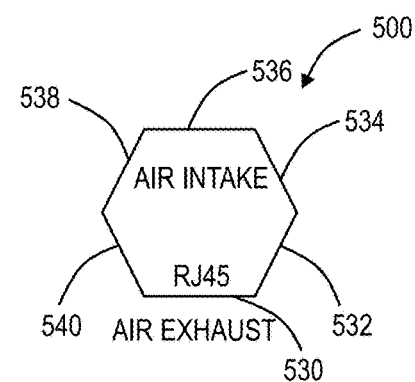

In FIG. 10, the access point 500 includes the top cover 516 over the base 518 and an electrical plug 508 protruding from a bottom portion 506 of the base 518. The base 518 includes RJ-45 ports 520 which enable data connectivity to the access point 500, e.g., via Ethernet cables. The base 518 can include other types of wired ports which are omitted for illustration purposes. The base 518 can also include various openings for air intake and/or exhaust including vents 522 located on a side of the base 518, vents 504 located on the bottom portion 506, an air gap 524 at a lid between the top cover 516 and the base 518, and an air gap 526 in the RJ-45 ports.

Of note, all of the openings (the vents 522, the vents 504, the air gap 524, and the air gap 526) are hidden when the access point 500 is plugged into an electrical outlet. By hidden, the openings are not easily observed by a person looking at the access point 500. Further, having multiple openings for air intake (the vents 522, the air gap 524 on the sides 532-540, and the air gap 526) allows fresher, cooler air to come to the components near the respective vents.

The electrical plug 508 provides two functions, namely, to connect electrically to a corresponding electrical outlet and to mechanically support the weight of the access point 500 while plugged into the electrical outlet. Thus, the bottom portion 506 will be disposed adjacent to a corresponding structure (e.g., wall) which has the electrical outlet (not shown). Accordingly, the vents 504 are recessed from the bottom portion 506 to allow a gap between the vents and the wall sufficient for airflow.

The base 518 can include a plurality of sides 530, 532, 534, 536, 538, 540. In an embodiment, the base 518 can have a hexagonal design, i.e., 6 sides. Of course, other embodiments are contemplated. The access point 500 uses different sides for air intake. FIG. 10 illustrates air flow in the access point 500 with air intake (cold or room temperature air) shown in solid lines and air exhaust (warm air) shown in dotted lines.

In an embodiment, the vents 522 and the air gap 524 on the side 530 are used for hot air exhaust while the vents 504, the air gap 524 on the other sides 532, 534, 536, 538, 540, and the air gap 526 are used for cold air intake. That is the air gap 524 are configured to segment between air intake and air exhaust based on the side 530-540. Additional details of the airflow within the access point 500 are described herein.

The top cover 516 can be snapped on the base 518 and can include the air gap 524 which is between the top cover 516 and the base 518. The air gap 524 is around on each side 530-540 and appears decorative or structural, i.e., not like a vent, and is hidden. The top cover 516 has structural elements which divide the air intake and air exhaust and the structural elements are double walled for improved isolation and to provide more resistance to air leaking from one side to the other and to provide a thermally isolating region between intake (cool air) and exhaust (hot air). There can be a division in the air gap 524 between the side 530 and the sides 532, 540 to separate air intake from air exhaust.

§ 6.0 POWER PLUG AND WALL OUTLET ABNORMAL FIT

Since there are old and loose outlets in some residential homes, there is possibility that the access point electrical plug can fall out and expose the plug blade. If the electrical plug blades get exposed then a possibility exists for a metal object to get in contact between the hot and neutral blades and cause an electrical short by connecting the positive and negative blades together with very little resistance between.

Figure 11:
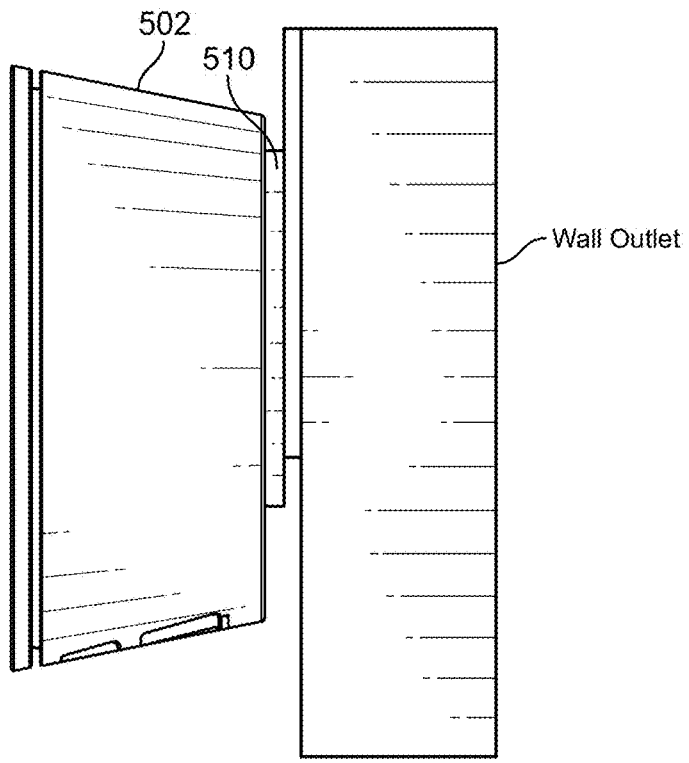
FIG. 11 is an illustration of the normal state of the access point electrical plug fully engaged with the electrical outlet.

An electrical short causes overload current in the electrical power circuit which in turn causes high heat, the high heat increases the temperature of the surrounding materials and has the potential to cause a fire. FIG. 11 is an illustration of the normal state of the access point electrical plug fully engaged with the electrical outlet. The access point 502 can be a fairly large device to be directly plugged into the wall. The extensive heat sinking within it makes it relatively heavy, however innovative techniques were required to make it stable when plugged in, preventing it from falling out. In addition, it has vents 504 on the bottom portion 506 to allow cooling airflow while hiding the less attractive vents from the consumer. Both of the above goals are met by having an "island" 510 of material around the electrical plug 508. This raised section, shown in FIGS. 7 and 8 as the island 510 creates a gap for airflow, and provides a large enough area to stabilize the physical form factor against the wall and prevent it from falling out of the plug.

Figure 12:
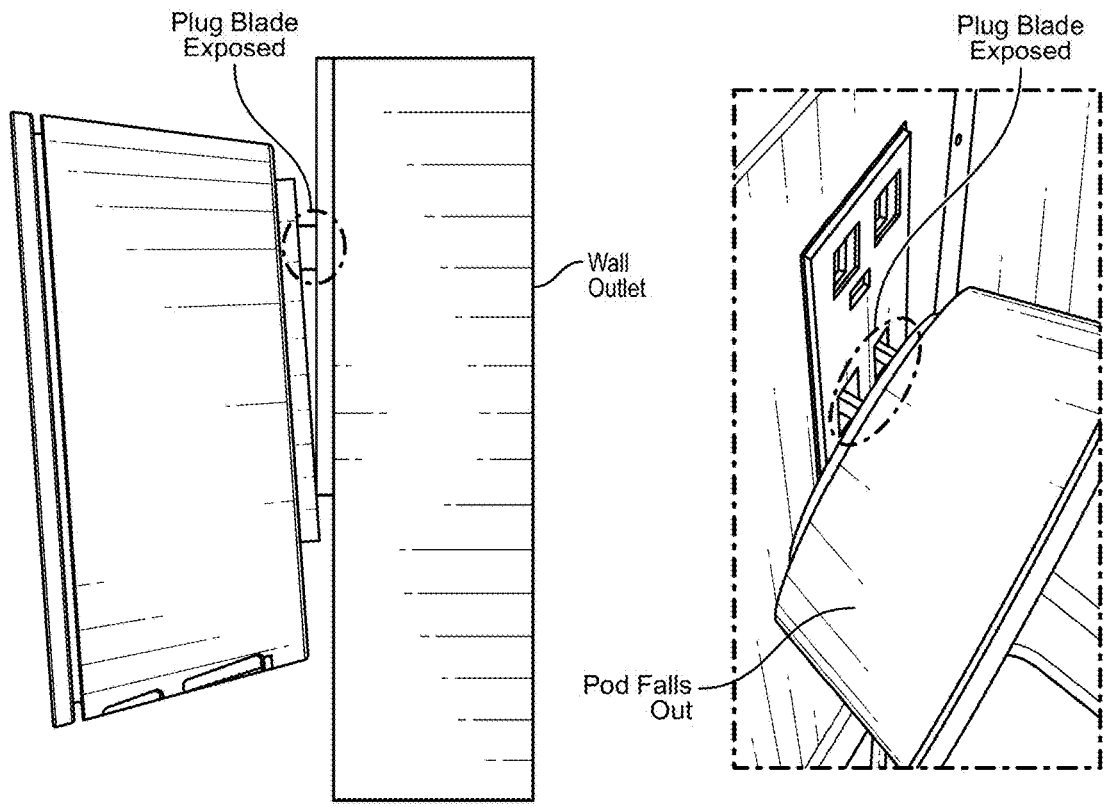
FIG. 12 is an illustration of a scenario where fitting issues occur between the electrical outlet and access point electrical plug.

FIG. 12 is an illustration of a scenario where fitting issues occur between the electrical outlet and access point electrical plug. The access point electrical plug 508 consists of a two pole, two blade configuration in what is known as a NEMA 1-15P. The electrical plug 508 consists of holes near the tip of the blade, these holes can work with some electrical outlets which have raised areas that help to snug fit the electrical plug blades with the internal contacts inside the electrical outlet. The electrical outlet consists of electrical contact points where the electrical plug fits between. These contact points inside the electrical outlet uses compression between the contacts where the electrical plug fits and provides mechanical support to hold the electrical plug 508 in place. Over time the electrical outlet contact area compression can get worn out and the electrical plug does not get the mechanical support needed to be held in place, especially if there is a force acting on the access point such as the weight of the access point itself. The electrical plug can gradually or suddenly fall out of the electrical outlet, depending on how far the electrical plug is disengaged with the outlet determines the potential risk where the user would need to be aware. As the access point begins to fall out of the electrical outlet the hot and neutral electrical blades become exposed and can increase the risk of an electrical short or eventually fall out of the electrical outlet enough to leave the access point totally disconnected from the power supply leaving the access point nonfunctional. There would be a benefit in knowing when the access point begins to fall out of the electrical outlet so that the user can be notified to resecure the access point 502 to the electrical outlet. The detection methods would need to be sensitive enough to measure the distance between the electrical outlet and the access point island 510 from fully engaged to fully disengaged which would be measured in millimeters.

§ 6.1 Fall Detection Mechanism for Power Plug

Figure 13:
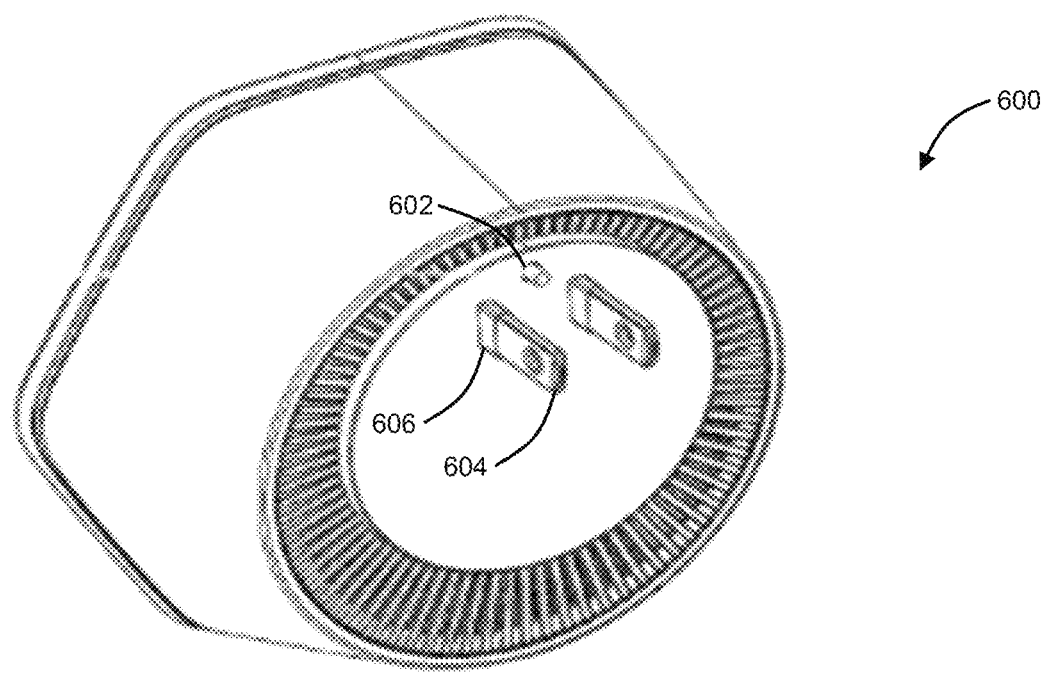
FIG. 13 illustrates the access point including a mechanical fall detection mechanism to detect disengagement of the electrical plug with the electrical outlet.

FIG. 13 illustrates the access point including a mechanical fall detection mechanism to detect disengagement of the electrical plug with the electrical outlet. As shown the access point island 510 includes a mechanical sensor 602 located above the electrical plug 604. This mechanical sensor 602 is sensitive enough to measure small gaps [millimeters (mm)] such that when the access point begins to fall out of the outlet it can provide a first level of disengagement where once the mechanical sensor 602 detects the first level it will work with the access point circuitry and internal antennas to send a message to the user(s) device to notify the user the access point is not fully engaged with the electrical outlet. If the electrical plug further falls to a second level of disengagement wherein risk of exposed electrical plugs could elevate the risk of an electrical short or disconnection of power from the outlet to the access point, the mechanical sensor 602 detects this second level and will work with the circuitry to turn off the power to the access point. The second setpoint will be set such that a second action will be taken to turn off the power supply such that the one or more additional access points take over the Wi-Fi access. As illustrated in 600 the electrical plug 604 further includes a plastic sleeve 606 which assists in making a better fit with the electrical outlet and also can provide protection against falling objects if the electrical plug 604 is disengaged from the electrical outlet. The first level and second level disengagement setpoints are within millimeters of one another therefore the mechanical sensor includes small distance measurements and includes activation of the access point notification and/or power supply disconnection.

Figure 14:
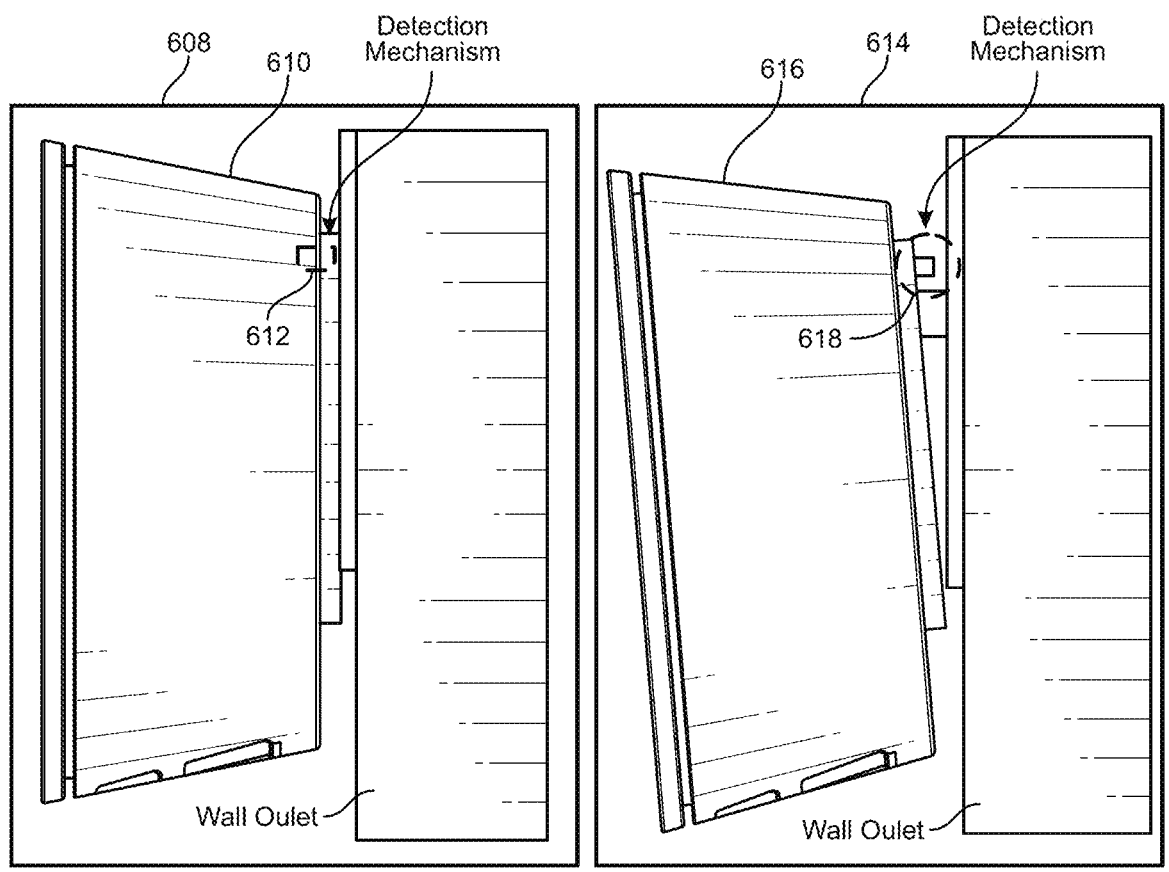
FIG. 14 illustrates the access point engaged into an electrical outlet wherein the access point includes a mechanical fall detection mechanism.

FIG. 14 illustrates the access point engaged into an electrical outlet wherein the access point includes a mechanical fall detection mechanism. The illustration 608 depicts the normal state of the access point 610 plugged into an electrical outlet. The mechanical sensor 612 is fully depressed and the access point circuitry is not initiated for notifications to the user or power system shutdown. As the access point pulls away from the electrical outlet as illustrated (614) the mechanical sensor extends 618 and the first mechanical sensor setpoint will initiate the access point circuitry to send notifications to the user device(s) to indicate a poor connection between the electrical plug and electrical outlet. A further disengagement of the access point 616 with the electrical outlet will engage a second setpoint and the mechanical sensor will initiate the access point circuitry and turn off power to the access point. As illustrated in 614 the mechanical sensor 618 is fully extended representing a fully disengaged access point and a scenario where the second setpoint is initiated and the power is turned off to the access point. The length of the mechanical sensor and the setpoints initiated by the sensor are measured in millimeters.

Figure 15:
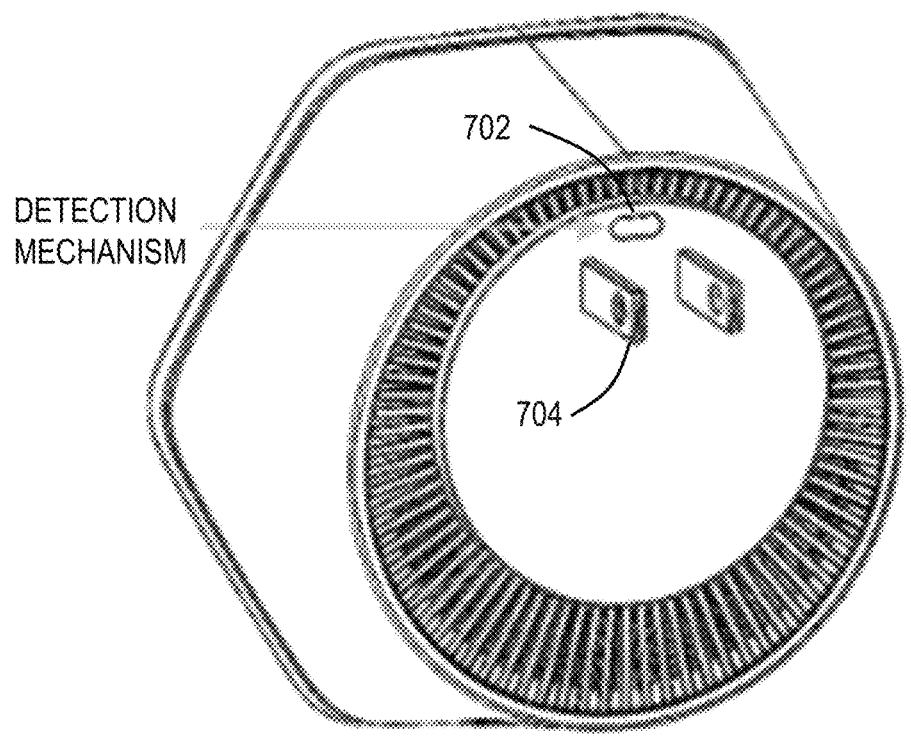
FIG. 15 illustrates the access point including an optical fall detection mechanism to detect disengagement of the electrical plug with the electrical outlet.

FIG. 15 illustrates the access point including an optical fall detection mechanism to detect disengagement of the electrical plug with the electrical outlet. As shown the access point island 510 consists of an optical sensor 702 located above the electrical plug 704. The optical sensor does not rely on a mechanical plunger or similar device to measure the detection gap between the electrical outlet and the access point island 510, therefore the implementation of the optical sensor can be flush with the back of the access point. As the access point pulls away from the electrical outlet the optical sensor setpoint will initiate first and second setpoints wherein the first setpoint will initiate the access point circuitry and antenna to send notification(s) to the user device(s) to indicate a poor engagement between the electrical plug and electrical outlet. If the second setpoint is reached in the optical sensor the sensor will initiate the access point circuitry and turn off power to the access point. The second setpoint will be set such that the electrical plug 704 is exposed and includes turning off the power supply such that the one or more additional access points take over the Wi-Fi access from the access point which is disengaged from the electrical outlet.

Figure 16:
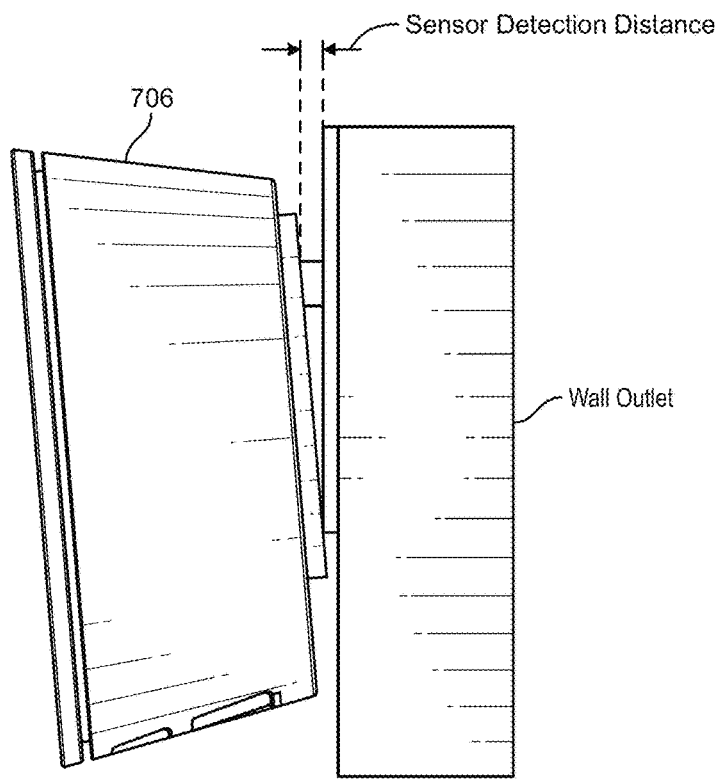
FIG. 16 illustrates the access point engaged into an electrical outlet wherein the access point includes an optical fall detection mechanism.

FIG. 16 illustrates the access point engaged into an electrical outlet wherein the access point includes an optical fall detection mechanism. The optical sensor 702 is located above the electrical plug 704 on the access point island 510. An optical sensor converts light rays or the change in light rays into electronic signals. In this application the optical sensor will measure changes in the light rays based on the distance of the optical sensor to the electrical outlet. As the access point pulls away from the electrical outlet the optical sensor detects the change in distance and is calibrated with two setpoints, the first optical sensor setpoint will initiate the access point circuitry and antenna to send notification(s) to the user device(s) to indicate a poor connection between the electrical plug 704 and the electrical outlet. The second setpoint will initiate the access point circuitry and turn off power to the access point. The plastic sleeve 606 allows the plug to be pulled out at a specific gap without having exposed electric plugs 704 and allow the user to be notified to fix the situation and plug the unit back in to a secure fully engaged position. When the electrical plug 704 gets pulled out past the plastic sleeve 606 further exposing the electrical plug than power can be shut off to the access point 706. The optical sensor has a measurement range and span which can detect the distance between the electrical plug and electrical outlet and have accurate setpoints that are set between the defined range.

Figure 17:
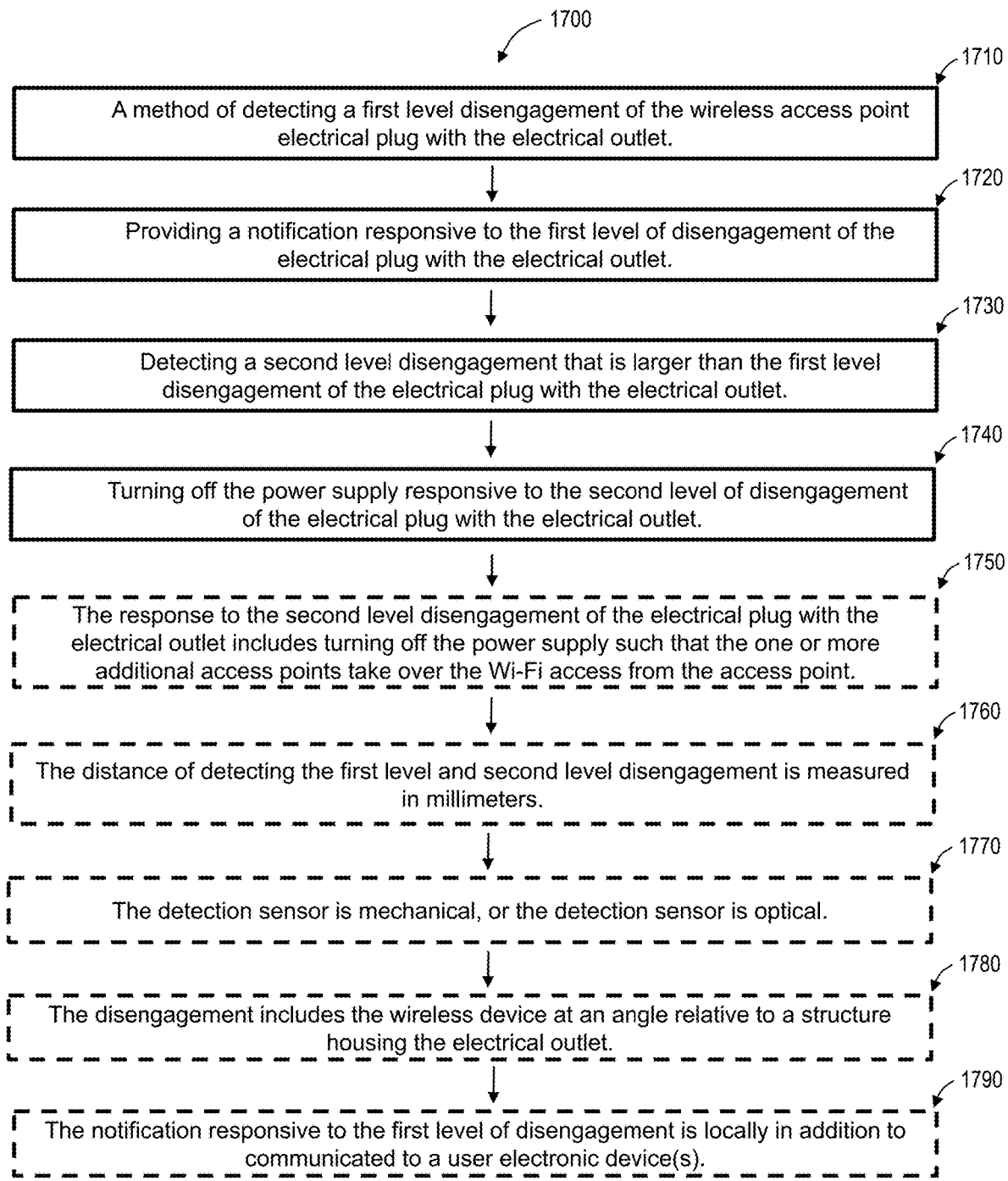
FIG. 17 is a flowchart for a method of electrical plug fall detection for an access point.

FIG. 17 is a flowchart for a method of electrical plug fall detection for an access point 1700. The method including detecting a first level of disengagement of the wireless access point electrical plug with the electrical outlet (1710) and providing a notification responsive to the first level of disengagement of the electrical plug with the electrical outlet (1720). The method further comprising of detecting a second level of disengagement that represents a larger distance between the access point and the electrical outlet (1730). Upon detection of the second level of disengagement, utilize the internal circuitry of the access point to turn off the power supply of the access point (1740). The response to the second level disengagement of the electrical plug with the electrical outlet includes turning off the power supply such that the one or more additional access points take over the Wi-Fi access from the access point that detected the disengagement (1750). The distance of detecting the first level and second level disengagement is measured in millimeters (1760) and the detection sensor is either mechanical or the detection sensor is optical (1770). The disengagement detection includes the wireless device at an angle relative to a structure housing the electrical outlet (1780). The notification responsive to the first level of disengagement is locally on the wireless device in addition to communicated to a user electronic device(s) (1790).

§ 6.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A wireless device comprising:
    a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply;
    an electrical plug connected to the power supply and extending from the bottom portion for insertion into an electrical outlet for power and for physical support of the wireless access point adjacent to the electrical plug; and
    a sensor configured to detect engagement and disengagement of the electrical plug with the electrical outlet.

2. The wireless device of claim 1, further comprising circuitry configured to:
    provide a notification responsive to the disengagement of the electrical plug with the electrical outlet.

3. The wireless device of claim 1, wherein the disengagement includes a first level and a second level that is larger than the first level, and the wireless device further comprising circuitry configured to:
    provide a notification responsive to the first level of disengagement of the electrical plug with the electrical outlet, and turn off the power supply responsive to the second level of disengagement of the electrical plug with the electrical outlet.

4. The wireless device of claim 1, further comprising a sleeve covering a portion of the electrical plug, where the portion is exposed responsive to the disengagement.

5. The wireless device of claim 1, wherein the sensor is mechanical.

6. The wireless device of claim 1, wherein the sensor is optical.

7. The wireless device of claim 1, wherein the electrical plug includes metal prongs directly soldered to one of the at least one PCB.

8. The wireless device of claim 1, wherein the wireless device is an access point in a Wi-Fi network.

9. The wireless device of claim 8, wherein the Wi-Fi network includes the access point and one or more additional access points cooperatively providing Wi-Fi access, and the wireless device further comprising circuitry configured to:
turn off the power supply responsive to the disengagement of the electrical plug with the electrical outlet, such that the one or more additional access points take over the Wi-Fi access from the access point.

10. The wireless device of claim 1, wherein the disengagement includes the wireless device at an angle relative to a structure housing the electrical outlet.

11. A method comprising:
detecting a first level of disengagement of the wireless access point electrical plug with the electrical outlet;
providing a notification responsive to the first level of disengagement of the electrical plug with the electrical outlet; and
detecting a second level disengagement that is larger than the first level disengagement of the electrical plug with the electrical outlet; and
turning off the power supply responsive to the second level of disengagement of the electrical plug with the electrical outlet.

12. The method of claim 11, wherein the response to the second level disengagement of the electrical plug with the electrical outlet includes turning off the power supply responsive to the disengagement of the electrical plug with the electrical outlet, such that the one or more additional access points take over the Wi-Fi access from the access point.

13. The method of claim 11, wherein the first level and second level disengagement is measured in millimeters.

14. The method of claim 11, wherein the sensor is mechanical.

15. The method of claim 11, wherein the sensor is optical.

16. The method of claim 11, wherein the disengagement includes the wireless device at an angle relative to a structure housing the electrical outlet.

17. The method of claim 11, wherein the notification responsive to the first level of disengagement is locally in addition to communicated to a user electronic device.

* * * * *